(12) United States Patent　　(10) Patent No.: US 7,212,397 B2
Lang　　(45) Date of Patent: ＊May 1, 2007

(54) ELECTROCHEMICAL CELL AND METHOD FOR ITS PREPARATION

(75) Inventor: Joel Lang, Givataim (IL)

(73) Assignee: Cellergy Ltd., Yoqneam (IL)

( * ) Notice: Subject to any disclaimer, the term of this patent is extended or adjusted under 35 U.S.C. 154(b) by 59 days.

This patent is subject to a terminal disclaimer.

(21) Appl. No.: 10/928,749

(22) Filed: Aug. 30, 2004

(65) Prior Publication Data

US 2005/0089754 A1　Apr. 28, 2005

Related U.S. Application Data

(60) Continuation-in-part of application No. 10/913,401, filed on Aug. 9, 2004, now Pat. No. 6,937,460, which is a division of application No. 10/368,014, filed as application No. PCT/IL03/00128 on Feb. 18, 2003, now Pat. No. 6,773,468.

(60) Provisional application No. 60/357,128, filed on Feb. 19, 2002.

(30) Foreign Application Priority Data

Feb. 18, 2003　(WO) ........................ PCT/IL03/00128

(51) Int. Cl.
*H01G 9/00* (2006.01)
(52) U.S. Cl. .................. 361/502; 361/503; 361/504; 361/508; 361/512; 361/523; 29/25.03
(58) Field of Classification Search ........ 361/502–504, 361/508–512, 516–520, 523–529; 29/25.03
See application file for complete search history.

(56) References Cited

U.S. PATENT DOCUMENTS

| 3,536,963 | A | 10/1970 | Boos |
| 4,604,788 | A | 8/1986 | Boos |
| 5,172,307 | A | 12/1992 | Tabuchi et al. |
| 5,350,645 | A | 9/1994 | Lake et al. |
| 6,212,062 | B1 | 4/2001 | Day et al. |

(Continued)

FOREIGN PATENT DOCUMENTS

EP　　0 292 991　　11/1988

*Primary Examiner*—Nguyen T. Ha
(74) *Attorney, Agent, or Firm*—Nixon & Vanderhye P.C.

(57) ABSTRACT

The invention relates to an electrochemical cell including: at least a pair of current collector plates that are placed in parallel to each other, flat electrodes containing aqueous electrolyte printed on opposing faces of said current collectors, such that a peripheral region is defined on each of said faces of said current collectors, which region is not covered by said electrode, and a separating medium interposed between said electrodes, the geometric form and size of said separating medium being identical to the form and size of said current collector plates, said separating medium having a central region permeable to said electrolyte, surrounded by a peripheral masked region which is non-permeable to said electrolyte, such that the permeable region of said separating medium coincide with the electrodes printed on the opposing faces of said current collectors, with respect to position, geometric form and size; wherein the pores in the peripheral region of the separating medium are impregnated with a suitable sealant, and wherein one or more layers of adhesives are deposited on said sealant in said peripheral region.

12 Claims, 5 Drawing Sheets

U.S. PATENT DOCUMENTS

| | | |
|---|---|---|
| 6,225,733 B1 | 5/2001 | Gadkaree et al. |
| 6,243,192 B1 | 6/2001 | Mitchell et al. |
| 6,316,142 B1 | 11/2001 | Delnick et al. |
| 6,341,057 B1 | 1/2002 | Nissen et al. |
| 6,426,863 B1 | 7/2002 | Munshi |
| 6,517,972 B1 | 2/2003 | Amatucci |
| 6,550,117 B1 | 4/2003 | Tokuoka et al. |
| 6,741,448 B2 | 5/2004 | Mido et al. |
| 6,937,460 B2 * | 8/2005 | Lang .................. 361/502 |

* cited by examiner

ELECTROCHEMICAL CELL AND METHOD FOR ITS PREPARATION

This application is a continuation-in-part of U.S. application Ser. No. 10/913,401, filed 09 Aug. 2004 now U.S. Pat. No. 6,937,460 which in turn was a divisional of Ser. No. 10/368,014 filed 19 Feb. 2003 now U.S. Pat. No. 6,773,468 and U.S. national phase of international application PCT/IL03/00128 filed 18 Feb. 2003, which claims benefit to U.S. provisional application Ser. No. 60/357,128, filed Feb. 19, 2002, the entire contents of these applications are incorporated herein by reference.

FIELD OF THE INVENTION

The present invention relates to energy storage devices, and specifically, to electrochemical capacitors, and to a method for preparing the same. In particular, the invention relates to the production of electrochemical capacitors or batteries based on aqueous electrolyte, and to an improved method of encapsulation thereof.

BACKGROUND OF THE INVENTION

There exists a need, in many different technological areas, for using electrochemical capacitors or batteries having small dimensions as energy storage devices.

In their most usual configuration, electrochemical capacitors, also known in the art as double layer capacitors, comprise a pair of flat electrodes saturated with a suitable electrolyte, wherein said electrodes are separated by a separating medium disposed therebetween. The separating medium, which may be either a porous sheet (known in the art as a separator), or a membrane, prevents the passage of electrical current in the form of electrons between the electrodes, while allowing ionic current to flow therebewteen, due to the porous nature of the separator or the gel type matrix of the membrane. Each of the flat electrodes is placed on a surface of a suitable plate, said plate often being referred to in the art as a current collector. The appropriately sealed capacitor is electrically connected to a suitable load by means of external terminals.

The electrical capacity of the above-described system is attributed to the double-layer formed at the interface of the solid electrode and the electrolyte solution following the application of electrical potential on the pair of electrodes.

Electrochemical capacitors are generally divided into two distinct categories, according to the type of electrolyte used for preparing the electrode, which may be either an aqueous or organic electrolyte solution. The former type may generate up to 1.2 volt per cell, whereas the latter type typically provides about 2.5 to 3.0 volts per cell.

The operating voltage of electrochemical capacitors may be increased by assembling a plurality of individual capacitors described above in series, to obtain an arrangement known in the art as a bipolar capacitor. The art has suggested numerous types of electrochemical capacitors, attempting to improve, inter alia, the structural features of the capacitor, the chemical composition of the electrode material placed therein and of the adhesives used for sealing said capacitor, and the processes for fabricating the same.

Attempts to fabricate a single electrochemical capacitor and a bipolar arrangement based thereon have met with two main difficulties. The first difficulty is related to the attachment of the electrode to the current collector plate, or its deposition thereon. The second difficulty relates to the sealing of the circumferential region of the electrochemical capacitor, in order to prevent the seepage of the electrolyte solution from the electrochemical cell.

U.S. Pat. No. 3,536,963 discloses an electrochemical capacitor comprising electrodes which are made by mixing activated carbon particles with an aqueous electrolyte (e.g., sulfuric acid), to obtain a viscous paste, which is subsequently compressed to form the electrodes. Each of the electrodes is placed within an annular gasket which is affixed to a circular current collector plate, following which the separator is interposed between the electrodes.

U.S. Pat. No. 4,604,788 discloses a chemical composition for carbon paste electrodes comprising activated carbon particles, aqueous electrolyte and fumed silica, to provide a pumpable carbon-electrolyte mix. The fabrication of the capacitor involves the filling of an electrode cavity with the pumpable mixture, following which excess water is removed by a procedure described in the patent.

U.S. Pat. No. 6,212,062 discloses an electrochemical capacitor based on a solution of organic electrolyte, and a method for fabricating the same.

It is an object of the present invention to provide an improved, economically superior and industrially applicable method for manufacturing energy storage devices that comprise an aqueous electrolyte, such as electrochemical capacitors or batteries, which method is based on printing techniques.

It is another object of the present invention to provide a printable composition suitable for the preparation of electrodes for use in electrochemical capacitors, which printable composition may be easily and conveniently applied in the production of said capacitors by means of various printing techniques.

It is yet another object of the present invention to provide an electrochemical capacitor featuring novel electrode composition and improved structural characteristics.

SUMMARY OF THE INVENTION

In one aspect, the present invention provides a method for preparing energy storage devices that contain electrochemical cells, and specifically, double layer capacitors, comprising the steps of:
a) Providing a printable composition suitable for use as an electrode, comprising an active material, which is preferably in the form of carbon particles in admixture with an aqueous electrolyte;
b) Placing a first template on one face of a current collector, wherein said first template is provided in the form of a sheet consisting of region(s) permeable to said printable composition, and masked region(s), non-permeable to said composition, wherein said masked region(s) of said first template include the margins thereof;
c) Applying said printable composition through said first template onto said face of said current collector, thereby forming well-defined electrode region(s) thereon;
d) Repeating steps b) and c) to produce a second current collector identical to the current collector of step (c);
e) Placing a second template on a face of a separating medium which may be either a porous film or a membrane, wherein said second template is provided in the form of a sheet consisting of masked and non-masked region(s), wherein said second template is essentially complementary to said first template, such that said masked regions on said second template correspond with the permeable regions of the first template;
f) Blocking the pores of said separating medium in those regions thereof which correspond with those regions of the current collector that have no electrodes printed thereon, and subsequently applying through the non-masked regions of said second template one or more adhesive materials onto said face of said separating medium;

g) Attaching the adhesive face of said separating medium to the first current collector, such that the non-masked region(s) on said face of said separating medium coincide with the electrode(s) printed on the face of said first current collectors, with respect to position, geometric form and size;

h) Repeating steps e) and f) with respect to the second face of said separating medium;

i) Placing said second current collector on said second face of said separator, such that the non-masked regions on said second face of said separator coincide with the electrode(s) printed on the face of said second current collector, with respect to position, geometric form and size.

As used herein, the term "printable composition" refers to a mixture exhibiting the necessary physical properties for application in printing techniques, such as screen-printing, stencil-printing and roller-coating. The inventor has surprisingly found that it is possible to improve the flowability properties and the thixotropicity of the composition used to prepare the electrodes according to the invention, thus rendering said composition particularly suitable for screen-printing applications, by mixing the active components (e.g., the carbon material and the aqueous electrolyte) in specific weight ratios and by introducing into the composition a combination of specific additives.

According to a particularly preferred embodiment of the invention, the printable composition used for preparing the electrodes comprises high surface area activated carbon particles and an aqueous electrolyte, wherein the preferred weight ratio between said activated carbon particles and said aqueous electrolyte is in the range of 1:8 to 1:20, and most preferably in the range of 1:10 to 1:18.

Preferably, the printable composition used for preparing the electrodes according to the invention further comprises one or more additives selected from the group consisting of inorganic fillers, which are preferably chosen from among fumed silica, high surface area alumina, bentonites or other clays, glass spheres and ceramics; one or more hydroxy-containing compounds, such as alcohols or polyols, wherein the hydroxy group(s) is (are) attached to $C_1$–$C_7$ alkyl, $C_2$–$C_7$ alkenyl, $C_3$–$C_7$ alkynyl or $C_3$–$C_7$ carbocyclic radical; and a salt. The inventor has surprisingly found that the presence of small amounts of one or more salts in combination with polyols reduces the viscosity of the printable composition. Thus, according to a particularly preferred embodiment, the printable composition comprises hydroxy-containing compound that is a polyol, and most preferably, propylene glycol, together with a small amount of a salt, which is preferably NaCl.

As used hereinabove, the term "separating medium" encompasses both separators and membranes according to their acceptable meanings in the art. Most preferably, the separating medium is provided in the form of a porous film known in the art as a separator.

Preferably, the method according to the invention comprises blocking the pores of said separator in those regions thereof which correspond with those regions of the current collector that have no electrodes printed thereon by applying through the non-masked regions of said second template a suitable sealant onto the face of said separator and rapidly curing said sealant to prevent passage thereof into those regions of the separator which need to be in contact with the electrode. Subsequently, one or more adhesive layers are applied onto the blocked regions of the separator, to allow the attachment of said separator to the current collector.

The fabrication method according to the invention provides a laminated structure, the external layers of which are the current collectors plates having well-defined electrode regions printed on their internal faces, and intermediate layer, which is a continuous separating medium interposed between the internal faces of the current collectors and affixed thereto by means of suitable adhesives, such that the electrodes are confined within said well-defined regions, the seepage of the electrolyte solution from said regions being prevented by virtue of the sealant blocking the pores of the separating medium and the adhesives provided along the perimeter of the electrodes.

The fact that the intermediate separator constitutes a continuous medium along the laminated structure described above is an important feature of the present invention, since, as may be readily appreciated, the electrochemical cells may be easily isolated from said laminated structure such that in each individual cell, the separator interposed between the electrodes is contiguous with the boundaries of the cell, and therefore, each individual cell is provided with an effective circumferential enclosure due to the sealant peripherally blocking the pores of the separator, and the adhesive layer(s) deposited on said sealant in the margins of said separator.

The electrochemical cell obtained by a preferred embodiment of the preparation method according to the invention is characterized by novel structural features, associated with the sequential blocking of the pores of the separator. Thus, in another aspect, the present invention provides an electrochemical cell comprising:

at least a pair of current collector plates that are placed in parallel to each other, flat electrodes containing aqueous electrolyte printed on opposing faces of said current collectors, such that a peripheral region is defined on each of said faces of said current collectors, which region is not covered by said electrode, and a separating medium interposed between said electrodes, the geometric form and size of said separating medium being identical to the form and size of said current collector plates, said separating medium having a central region permeable to said electrolyte, surrounded by a peripheral masked region which is non-permeable to said electrolyte, such that the permeable region of said separating medium coincide with the electrodes printed on the opposing faces of said current collectors, with respect to position, geometric form and size;

wherein the pores in the peripheral region of the separating medium are impregnated with a suitable sealant, and wherein one or more layers of adhesives are deposited on said sealant.

Preferably, the sealant blocking the pores of the separating medium in the electrochemical cell according to one preferred embodiment of the present invention is made of a printable, rapidly curable material, and is most preferably UV curable epoxy.

The electrochemical cell obtained by a preferred embodiment of the preparation method according to the invention is characterized by novel chemical features, associated with the composition of the electrode. Thus, in another aspect, the present invention provides an electrochemical cell comprising:

at least a pair of current collector plates that are placed in parallel to each other, flat electrodes containing aqueous electrolyte printed on opposing faces of said current collectors, such that a peripheral region is defined on each of said faces of said current collectors, which region is not covered by said electrode, and a separating medium interposed between said electrodes, the geometric form and size of said separating medium being identical to the form and size of said current collector plates, said separating medium having a central region permeable to said electrolyte, surrounded by a peripheral masked region which is non-permeable to said electrolyte, such that the permeable region of said separating medium coincide with the electrodes printed on the opposing faces of said current collectors, with respect to position, geometric form and size;

and wherein the electrode comprises carbon particles, aqueous electrolyte, inorganic filler selected from the group consisting of fumed silica, high surface area alumina, bentonites, glass spheres and ceramics and one or more hydroxy-containing compound(s), which are preferably alcohols or polyols, wherein the hydroxy group(s) is (are) attached to $C_1$–$C_7$ alkyl, $C_2$–$C_7$ alkenyl, $C_3$–$C_7$ alkynyl or $C_3$–$C_7$ carbocyclic radicals, and optionally an inorganic salt, which is preferably selected from the group of alkali halides. Preferably, the inorganic filler is fumed silica, the hydroxy-containing compound is a polyol, which is preferably propylene glycol, and the salt is NaCl.

In another aspect, the present invention relates to bi-polar electrochemical capacitor comprising, as a basic cell unit, the electrochemical cell disclosed above.

All the above and other characteristics and advantages of the present invention will be further understood from the following illustrative and non-limitative description of preferred embodiments thereof.

DETAILED DESCRIPTION OF PREFERRED EMBODIMENTS

Figure 1:
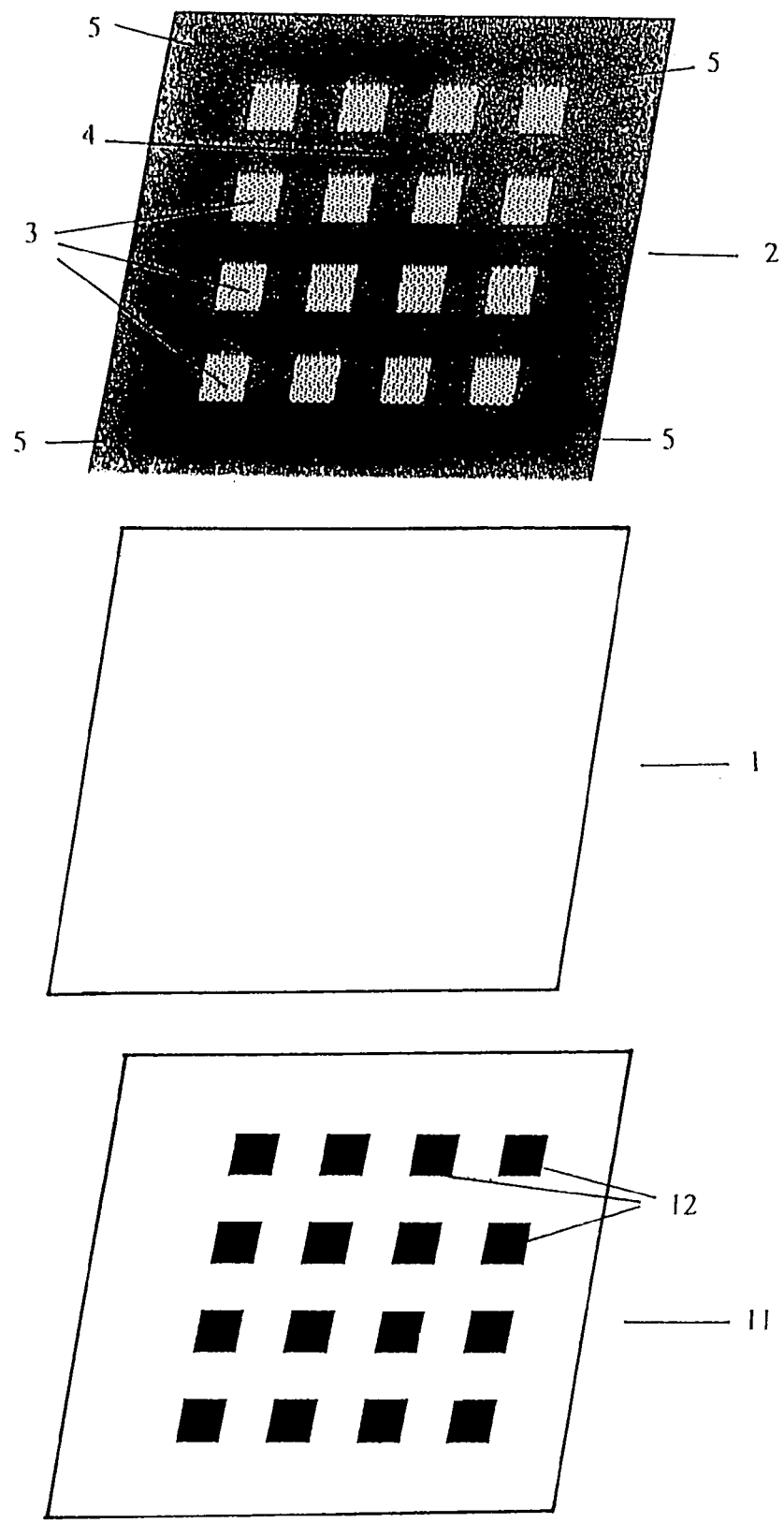
FIG. 1 shows a current collector before and after the deposition of electrodes thereon by the method of the present invention.

The following description refers, for the purpose of simplicity, specifically to the preparation of an electrochemical cell for use as a capacitor. It may be appreciated that the electrochemical cell provided by the present invention may be also used as a battery.

The method for preparing an electrochemical capacitor according to the present invention involves the preparation of a printable composition comprising carbon material, an aqueous electrolyte and preferably one or more additives selected from the group consisting of fumed silica and hydroxy-containing compounds which are preferably alcohols or polyols.

Preferably, the printable composition used to prepare the electrodes according to the present invention comprises carbon particles having specific surface area above 800 $m^2 \cdot g^{-1}$, and more preferably above 1200 $m^2 \cdot g^{-1}$. Suitable carbon particles include, but not limited to, activated carbon or activated charcoal and carbon black. Methods for preparing activated carbon suitable for use in the preparation of electrodes for electrochemical capacitors are known in the art (see, for example, U.S. Pat. No. 6,310,762).

Commercially available activated carbon for use according to the present invention is, for example, Black Pearl carbon 2000 manufactured by Cabot. The percentage of the carbon material of the total weight of the printable composition is in the range of 4 to 10 (wt %), and more preferably in the range of 5 to 9 (wt %).

The printable composition used to prepare the electrodes according to the present invention comprises an aqueous electrolyte, which may be either acidic or alkaline solution. Preferred electrolytes are strong or weak acids such as sulfuric acid, phosphoric acid and hydrobromic acid, most preferred being an aqueous solution of sulfuric acid. The weight percentage of the aqueous solution of the electrolyte of the total weight of the printable composition is in the range of 80 to 96 (wt %), and more preferably in the range of 85 to 95 (wt %), with the weight ratio between the carbon material and said aqueous electrolytic solution being above 1:8, and more preferably between 1:10 to 1:18.

The printable composition used to prepare the electrodes according to the present invention comprises inorganic filler having thickening and thixotropic properties selected from the group consisting of fumed silica, high surface area alumina, bentonites or other clays, glass spheres and ceramics, most preferred being fumed silica, which is amorphous silicon dioxide having high external surface area. Commercially available fumed silica includes, for example, CAB-O-SIL™ M-5 (CAS No. 112945-52-5). The weight percentage of the inorganic filler of the total weight of the printable composition is in the range of 0.1% to 4%, and more preferably in the range of 0.5% to 2.5%.

The printable composition used to prepare the electrodes according to the present invention preferably comprises a compound containing one or more hydroxy groups, and more specifically, alcohols or polyols, wherein the hydroxy group(s) is (are) attached to $C_1$–$C_7$ alkyl, $C_2$–$C_7$ alkenyl, $C_2$–$C_7$ alkynyl or $C_3$–$C_7$ carbocyclic radicals, or a mixture of such hydroxy-containing compounds. Most preferred are polyols such as 1,2-ethanediol or 1,2-propandiol (i.e, propylene glycol). The percentage of the hydroxy-containing compound(s) of the total weight of the printable composition is in the range of 0.1 to 20 (% wt), and more preferably in the range of 0.3% to 10%.

It has been unexpectedly found that the presence of alkali halide salt in an amount of about 0.2 to 5 (wt %) of the total weight of the printable composition, improves the flowability properties of said composition.

Other additives that can be used in the preparation of the printable composition according to the present invention may be selected from the group consisting of metal oxides (e.g., oxides of platinum, titanium and ruthenium), thickening and thixotropic agents, surface-active agents, wetting agents, emulsifiers (e.g., fish oil), polymers and copolymers such as polyvinylacetate (PVA), polymethylmethacrylate (PMMA), polyethylene glycol (PEG), PAA, Carbomer, gelatin, water based adhesives, quinones or polyquinones. Graphite and carbon in the form of carbon fibers, fullerenes and buckeyballs may also be used in the preparation of the printable composition.

The printable composition according to the invention may be prepared by mixing together the solid constitutes (i.e., the carbon material and the inorganic filler), and subsequently gradually adding the liquids comprising the aqueous electrolyte and the hydroxy-containing compound, (i.e., the alcohol(s) or polyol(s)) to the solid mixture, optionally together with the salt, while continuously vigorously mixing the blend to obtain a uniform composition having paste-like consistency. However, the printable composition may also be prepared by a different order of operations, such as by adding the fumed silica into a mixture of the carbon material, the electrolyte solution and the alcohol(s) or polyol(s).

FIG. 1 schematically illustrates the process of forming well-defined electrode regions on a current collector plate by means of screen-printing technique. It should be noted, however, that other printing techniques, such as stencil printing, may also be applied for depositing the electrodes onto the current collector.

Referring now to FIG. 1, current collector plate 1 is made of a conductive material that is chemically inert to the aqueous electrolyte contained in the electrode. The current collector may be provided in the form of a metal foil, such as aluminum foil, plated metal or metal coated with a protective oxide. Alternatively, the current collector is a polymeric sheet, such as polyethylene or Polytetrafluoroethane (Teflon), loaded with conductive particles such as carbon black, graphite, metallic or plated metallic particles. In another embodiment, the current collector has a multi-layer structure comprising alternating layers of suitable polymers, metal foils and carbon or graphite, or similar combinations. The thickness of the current collector is preferably in the range of 10 µm to 150 µm.

Template 2 is provided in the form of a mesh or stencil suitable for use in printing techniques, wherein said mesh or stencil consists of regions 3 permeable to the printable composition, and masked regions 4, non-permeable to said composition, wherein each of said permeable regions has a well-defined geometrical form corresponding to the form of the final electrochemical capacitor to be produced. For the purpose of illustration, sixteen separated non-masked, permeable regions having a square shape are shown in the figure, although, of course, a different number of non-masked regions of other shapes, such as rectangular or circular shapes, is also applicable. Typically, in case that the non-masked, permeable regions are in the form of a square, the side thereof has a size in the range of 0.5 to 60 mm, more preferably 5 to 20 mm. An important feature of the template is that its margins 5 are always masked.

The template 2 may be prepared by masking commercially available screen (40 to 250 mesh) according to the desired pattern by methods well known in the art.

Current collector 1 is placed on the vacuum surface of a screen-printing device (not shown), wherein template 2 is used as the screen. The printable composition according to the present invention is screen-printed through template 2 onto one face of the current collector 1. Numeral 11 shows the resulting current collector, having sixteen well-defined, separated electrode regions 12 thereon. The thickness of the electrode layer is typically about 10 to 120µ. The procedure described above is repeated in respect to a second current collector, to produce a second current collector having electrodes printed thereon.

Figure 2:
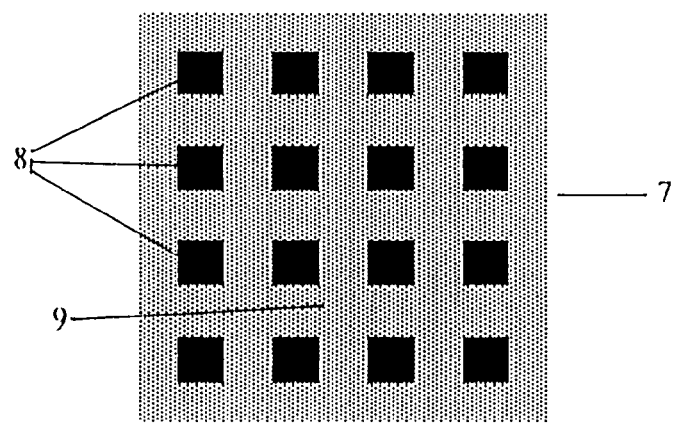
FIG. 2 shows a separator before and after the partial masking of well-defined regions thereof by the method of the present invention.
Figure 2:
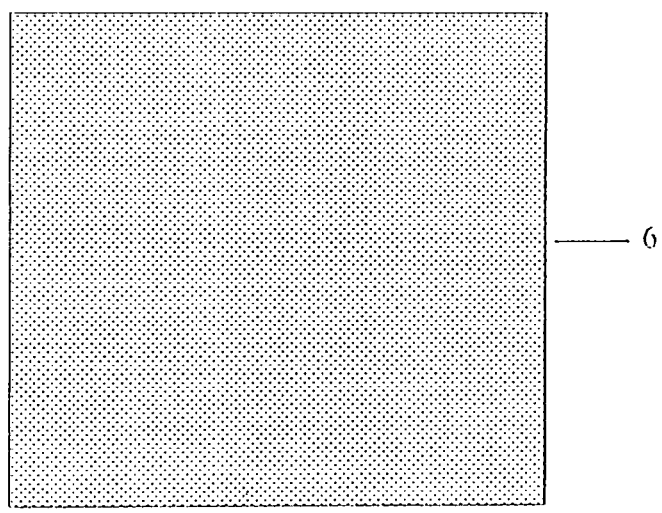
Figure 2:
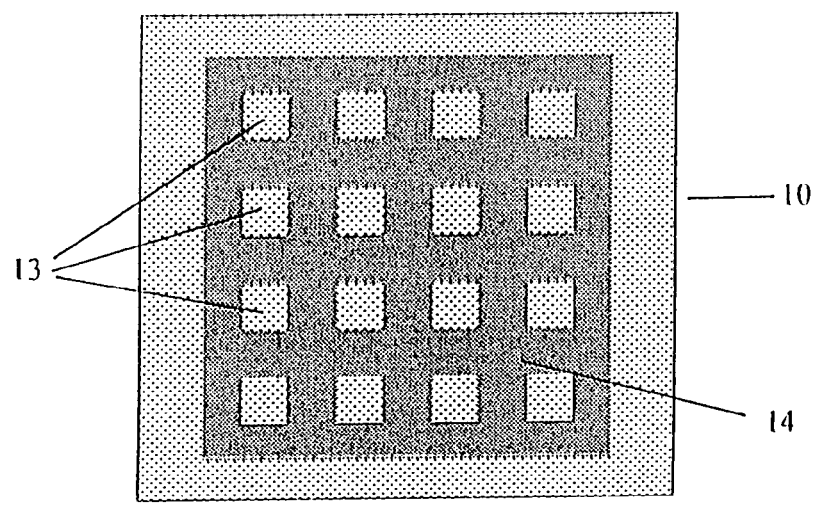

FIG. 2 illustrates a preferred mode of blocking the pores of the separator in those regions thereof that correspond with those regions of the current collectors that have no electrodes printed thereon. It should be noted, however, that various techniques may be used according to the present invention in order to selectively block the pores of the separator in the desired regions, which techniques include impregnating said pores with a suitable sealant, or with a mixture of sealants, wherein said sealant(s) may optionally be carried in a liquid vehicle. The impregnation may be accomplished by means of screen-printing or spraying the sealant onto said regions.

Alternatively, a polymeric sheet may be placed on the separator, following which said sheet is selectively heated in the desired regions, such that the molten polymer flows into the pores in said regions and is subsequently allowed to solidify therein.

Other techniques for blocking the desired regions of the separator include the application of heat and/or pressure, in order to cause the porous structure to collapse in said regions, whereby non-porous zones are formed. Combinations of the above-described techniques are also applicable according to the present invention.

It may be appreciated that according to the present invention, the sealant needs to be rapidly curable, that is, the sealant must be capable of transforming from a flowable form into solid, non-flowable form, within a short period of time, in order to avoid its passage into those regions of the separator which need to be in contact with the electrode. Typically, the sealant needs to be cured within seconds or minutes, depending on the thixotropic properties thereof and the characteristics of the separator (e.g., material, pore size). The sealant is cured by methods known in the art, such as UV, IR or microwave or heat drying curing, or by polymerizing the sealant monomer, or by any other solidification procedure.

FIG. 2 shows the selective blocking of the desired regions of the separator by means of screen-printing technique. Separator 6 used according to the present invention is provided in the form of an inert, porous, electronically non-conductive, ion-permeable film, made of material inert to the aqueous electrolyte contained in the electrodes. The separator may be a glass fiber sheet or may be made of polyethylene, polypropylene, polyester, cellulose, Teflon or PVDF, or a composite of a polymer and a suitable filler. Teflon or cellophane-made separators may be used in case of acidic or alkaline electrolyte, respectively. The thickness of the separator is in the range of 5 to 50µ and its porosity typically varies within the range of 30 to 80%.

A second template 7 is provided in the form of a screen or stencil suitable for use in printing techniques. The screen may be made of polyester, nylon, stainless steal or coated stainless. As shown in the figure, the screen consists of a plurality of separated masked regions 8 and a non-masked region 9, such that said screen is essentially complementary to the first template 2 shown in FIG. 1. The preparation of template 7 is carried out similarly to that of template 2. The meshes of the template 7 must permit the penetration of the adhesive materials, which need to be screen printed onto the separator, into the pores of the separator. To this end, a mesh corresponding to about 20 $cm^3$ per square meter printing volume is generally satisfactory.

Separator 6 is placed on the vacuum surface of a screen-printing device (not shown) wherein template 7 is used as the screen. The pores of separator 6 are blocked by a suitable sealant that is screen-printed onto Separator 6 through template 7. The resulting, partially blocked separator is indicated by numeral 10, wherein the non-masked and blocked regions are indicated by numerals 13 and 14, respectively. The sealant used may be selected from the group consisting of hot melt adhesives, solvent based adhesives, polyurethanes, silicones, cyanoacrylates, PVC adhesives, Acrylic adhesives, UV based adhesives, water based glues, polysulfides rubber or synthetic rubbers, phenolic resins pressure sensitive adhesives, UV cured pressure sensitive adhesives and solvent based pressure sensitive adhesives. Most preferably, epoxy that is based on UV curing is screen-printed onto the separator 6, and is subsequently immediately cured by means of exposure to UV light.

According to another preferred embodiment, the sealant blocking the pores of the separator in the electrochemical capacitor is provided in the form of one or more polymers or copolymers carried in a liquid vehicle, either in the form of a solution, a suspension or an emulsion. The sealant-containing liquid vehicle is screen-printed or sprayed onto separator 6 through template 7, using the procedures described above, following which the sealant is rapidly cured by evaporating the liquid vehicle therefrom. The sealant polymer/copolymer used according to this embodiment of the invention belongs to the class known in the art as heat or pressure activated adhesives, such that upon exposure to heat and/or pressure said polymer/copolymer becomes gluey, and upon cooling it becomes solid while retaining its adhesion capacity towards various substrates. Polymers or copolymers which may be suitably used are preferably selected from the group consisting of polyvinylchloride (PVC), Polyethylene, polyacrylic acid, polypropylene, rubber, polyvinyldifluoride (PVDF) and polytetrafluoroethylene (PTFE). Suitable liquids for carrying the aforementioned polymers include ketones such as acetone, methyl ethyl ketone, methyl isobutyl ketone, cyclohexanone and the like; aliphatic ester solvents such as ethyl acetate and the like; alcohols, NMP, water or mixtures thereof. Emulsion of polyvinyl acetate in water or an alcohol may also be used. A particularly preferred sealant is PVC, or PVC-rubber combination, dissolved in a ketone solvent as the liquid carrier. The aforementioned compositions of sealant and liquid carrier are commercially available. It is important that the heat and/or pressure activated adhesive be inert towards the electrolyte in the capacitor. Furthermore, the weight ratio of the sealant and the liquid vehicle carrying the same is most preferably such that during the curing step, namely, during the evaporation of the liquid vehicle, the flow of the polymeric sealant is retarded to minimum. It has been found that the concentration of the polymeric sealant in the liquid vehicle is in the range of 10–70% (weight ratio). Furthermore, wetting agents, leveling agents and thickening agents may be suitably added into the liquid vehicle comprising the sealant dissolved or suspended therein, in order to improve the printability properties of the composition. Commercially available additives that may be used in this regard include disperbyk 111, disperbyk 121, disperbyk 181 manufactured by BYK, CAB-O-SIL™ M-5 and BYK 410. If desired, air release agents, such as BYK 020, BYK 024, BYK 051, BYK 066 and BYK 070, may be also added into said composition, in order to minimize the formation of bubbles therein. It should be noted that following the evaporation of the liquid vehicle from the pores of the separator, spaces may be undesirably formed within the sealant blocking the porous structure of the separator. Upon applying heat and pressure onto the separator, such as by subjecting the same to a laminating procedure, these spaces, as well pores which initially were only partially impregnated with the liquid vehicle containing the sealant, will collapse, whereby the peripheral region of the separator (the region which is not positioned between the electrodes of the capacitor) is appropriately sealed and blocked.

Having cured the sealant used to block region 14 of separator 10, one or more adhesive layers are screen-printed onto separator 10 through template 7. Suitable adhesives may be selected from among the classes specified above. It should be noted that when a heat and/or pressure activated adhesive is used a sealant, the blocking of the pores in region 14 and the successive deposition of adhesive layer onto said region may be carried out in a continuous manner, by screen-printing or spraying an excess amount of the liquid vehicle comprising the heat and/or pressure activated adhesive onto said region. Having impregnated the pores, the residual amount of the screen-printed or sprayed composition will form a layer on region 14. Following curing, the solid layer deposited on region 14 will become gluey upon subsequent application of heat and/or pressure thereto, thus rendering the face of separator 10 adhesive.

The adhesive face of separator 10 is subsequently affixed to the first current collector, such that the non-masked regions 13 on said face of said separator coincide with the electrodes 12 printed on the face of said first current collectors, with respect to position, geometric form and size. The current collector and the separator may be pressed or laminated together in vacuum to exclude air voids. The structure obtained is placed on the vacuum table of a screen-printing device, with the separator facing upwardly, and the procedure described above regarding the blocking of the desired regions of the separator, and the subsequent application of adhesive layers onto the blocked regions is repeated with respect to the second face of the separator.

Figure 3A:
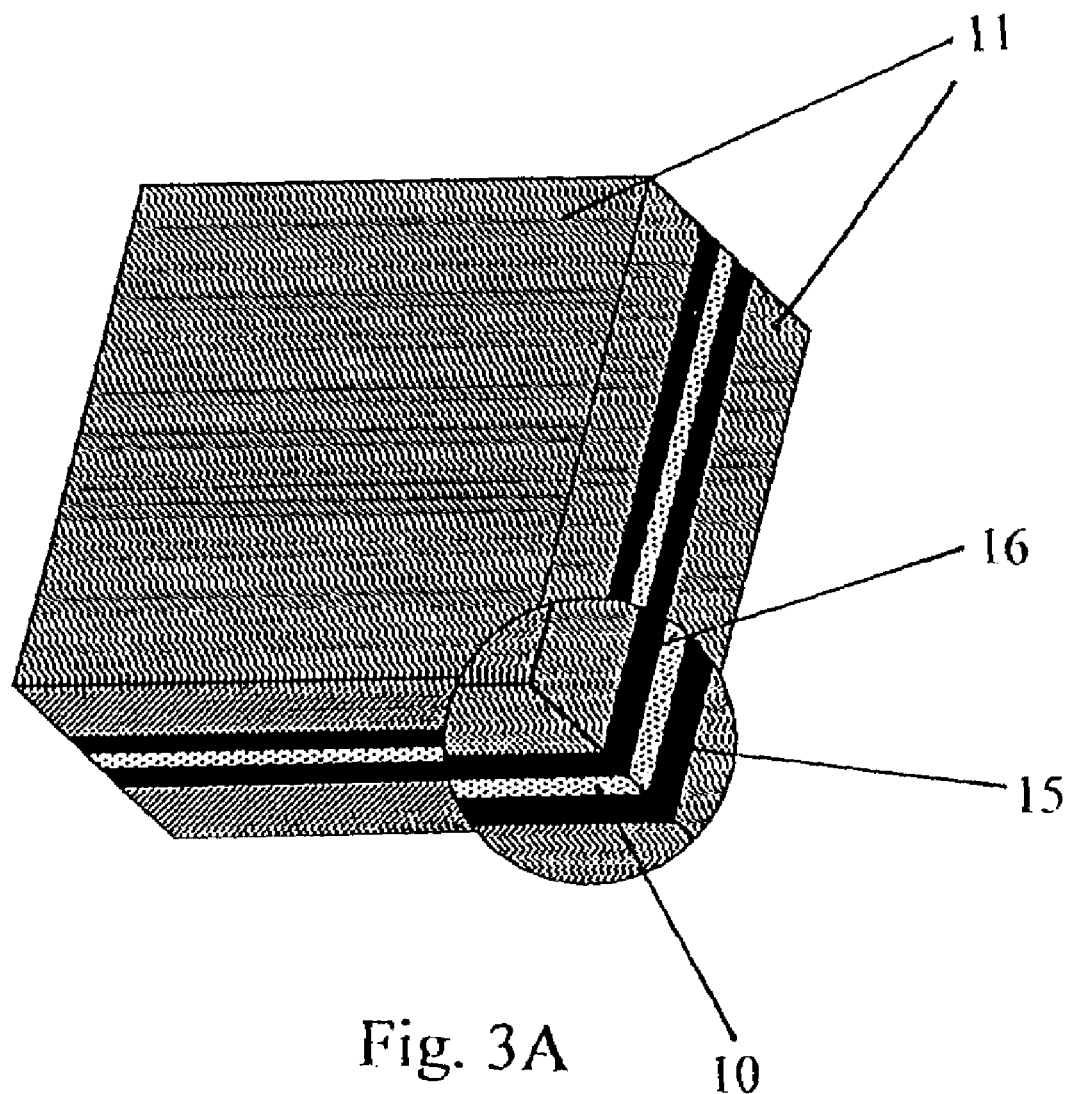
FIGS. 3a and 3b provide sectional views of laminated structures obtainable according to the present invention.

A second current collector is then affixed to the separator, to produce the laminated structure represented in FIG. 3a. The laminated structure comprises external layers, which are the current collectors plates 11 having sixteen well-defined electrodes printed on their internal faces (not shown), and intermediate layer, which is a continuous separator 10 interposed between the internal faces of the current collectors 11, said separator being impregnated with a suitable sealant, such that the pores of the separator are essentially blocked in those regions thereof which are not placed between the electrodes. The separator 10 is affixed to the current collectors 11 by means of adhesive layers 15, 16 (shown in black in the figure).

It is apparent from the figure that the laminated structure according to the invention is sealed along its circumference by means of the sealant blocking the pores of separator 10, and adhesive layers 15 and 16 deposited on said sealant. The existence of distinct layers of a sealant material blocking the pores of the separator and one or more adhesives deposited thereon, is an important feature of the laminated structure according to the invention, which feature may be detected by using optical means.

Figure 4:
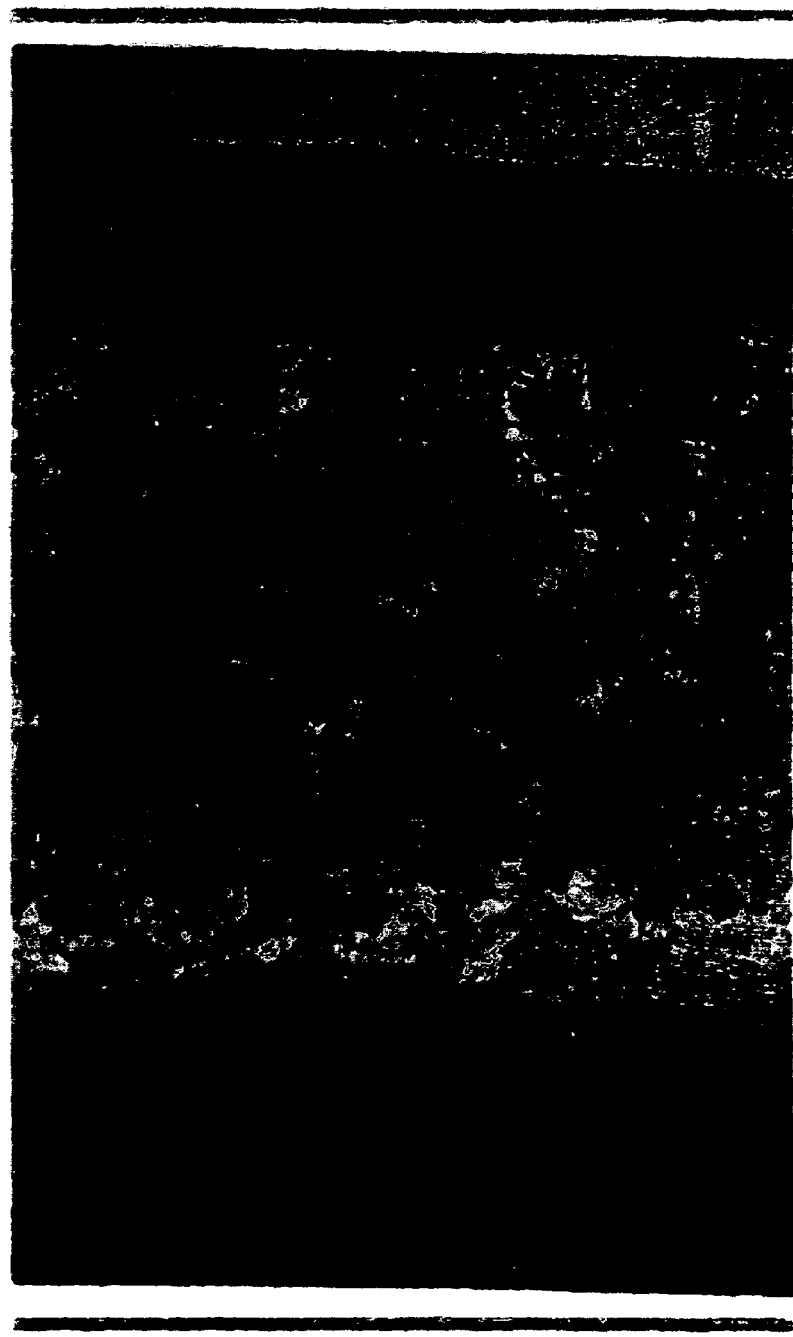
FIG. 4 is a photograph obtained by electron microscope scanning, showing the blocked pores of the separating medium according to the present invention.

FIG. 4 is a photograph obtained by electron scanning microscopy, showing a cross-section of a preferred electrochemical cell according to the present invention. The pores in the peripheral region of the separator 10 (the region which is not placed between the electrodes) are impregnated with a sealant which is selected from the group consisting of heat and/or pressure activated adhesives, such as those previously described, which sealant has been delivered into the pores by means of a printable liquid vehicle, followed by evaporation of the liquid. An essentially continuous layer, indicated by numeral 15, is deposited on said sealed peripheral region of the separator, which continuous layer is made of the same heat and/or pressure activated adhesive that was used to block the pores in said peripheral region. Following activation by means of heat and/or pressure, this layer serves to hold on the cell components together.

Individual electrochemical capacitors may be easily isolated from the laminated structure described in FIG. 3a, such that each individual capacitor comprises a pair of current collectors having electrodes printed on their internal faces and a separator interposed therebetween, the geometric form and size of said separator being identical to the form and size of said current collector, said separator being contiguous with the boundaries of the capacitor. Each of the isolated capacitors obtained is capable of storing charge and may be used as an electric double-layer capacitor with a dielectric strength corresponding to about 0.7 to 1.0 volts. For many practical utilities, however, it is preferred to assembly together a plurality of laminated structures of FIG. 3a to produce the bi-polar arrangement illustrated in FIG. 3b. It should be noted, that each face of internally placed current collector plates 17 is provided with well-defined regions of electrodes (not shown) printed thereon. According to the bi-polar configuration, the electrodes printed on different faces of a given current collector are oppositely charged. The assembly of a plurality of laminated structures of the invention, to obtain the bi-polar configuration shown in FIG. 3b, may be accomplished by methods known in the art. For Example, three laminated structures, designated A, B, and C (not shown), which are prepared separately in accordance with the present invention, may be assembled to form a bi-polar configuration in the following manner. The printable composition used to form the electrodes is screen-printed onto the two faces of the laminated structure B, which is intended to be internally placed within the bi-ploar configuration, using the printing procedures described above. Electrodes are then deposited onto one face of each of the two remaining laminated structures A and C (that is, only one face of A is provided with electrodes thereon, and similarly, only one face of C is provided with electrodes thereon, such that the non-active faces of said A and C laminated structures will subsequently define the external faces of the bi-polar arrangement). Suitably masked separators, prepared in accordance with the procedures described above, are interposed between each of the two active faces of B and the corresponding active faces of A and C, using the procedures described hereinbefore in respect to the preparation of the separated laminated structure illustrated in FIG. 3a. It may be appreciated that the resulting capacitor assembly has a bi-polar configuration comprising five unit cells.

Figure 3B:
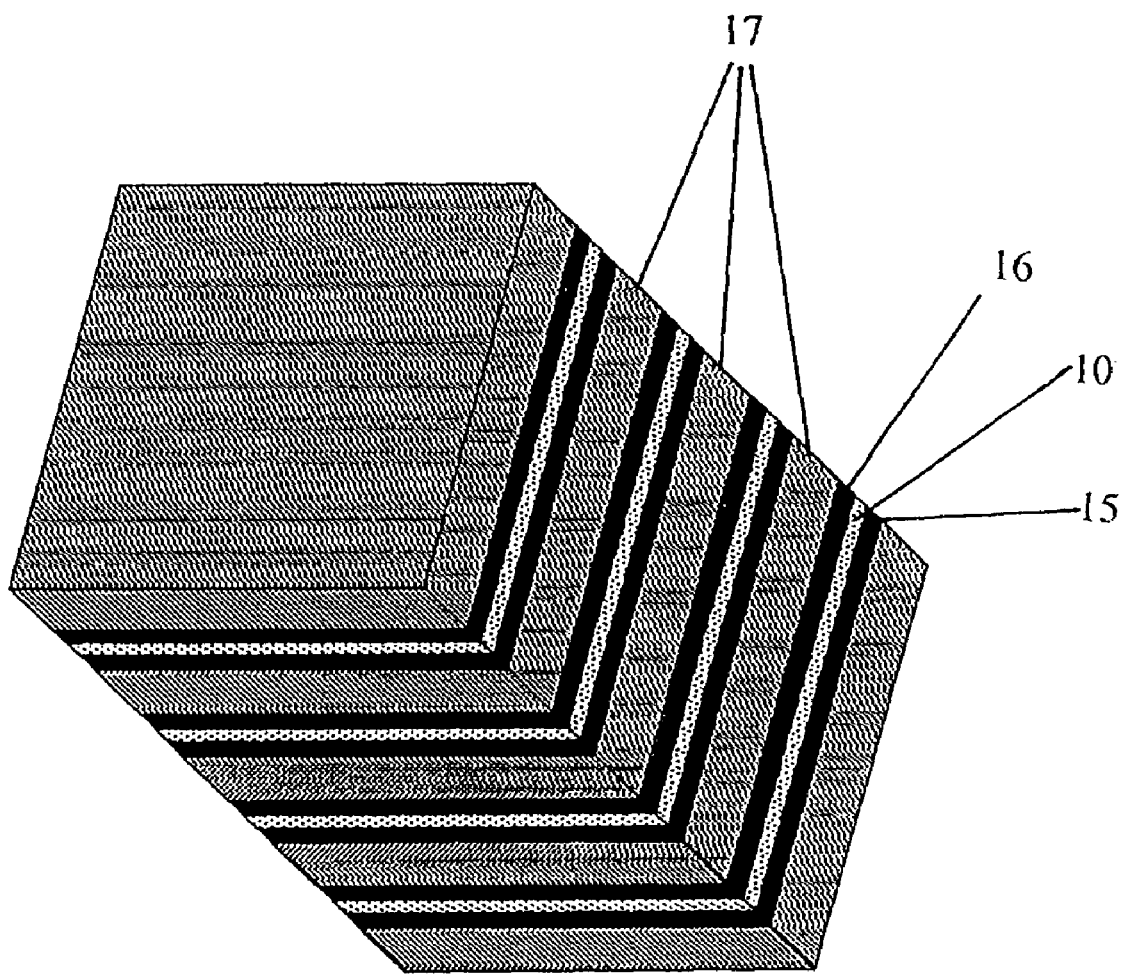

The electrochemical capacitor according to the invention, either in its simplest form comprising one pair of current collectors having electrodes printed on their internal faces and a separator interposed therebetween, or in the bi-polar configuration, are isolated from the laminated structures of FIGS. 3a and 3b, respectively, and are subsequently packed within a suitable casing and connected to external terminals by methods well known in the art.

The following non-limiting working examples illustrate various aspects of the present invention.

EXAMPLES

Example 1

Preparing a Printable Composition for the Electrodes

Ingredients:
Activated carbon
Sulfuric acid
Fumed silica 6 grams of high-surface area activated carbon (Black Pearl Carbon 2000 Manufactured by Cabot Corporation) were mixed with 1 gram of fumed silica (CAB-O-SIL™ grade M-5 of Cabot Corporation). To the powder obtained were added 93 grams of an aqueous solution of $H_2SO_4$ (4M). Following an extensive mixing for 24 hours using ball mills, a paste-like composition is formed, suitable for screen-printing applications.

Example 2

Preparing a Printable Composition for the Electrodes

Ingredients:
Activated carbon
Sulfuric acid
Fumed silica
Propylene glycol 35 grams of high-surface area activated carbon (Black Pearl Carbon 2000 Manufactured by Cabot Corporation) were mixed with 2 grams of fumed silica (CAB-O-SIL™ grade M-5 of Cabot Corporation). To the powder obtained was added a mixture of 520 grams of an aqueous solution of $H_2SO_4$ (3M) and 16 grams of propylene glycol. Following an extensive mixing for 24 hours using ball mills, a paste-like composition is formed, suitable for screen-printing applications.

Example 3

Preparing a Printable Composition for the Electrodes

Ingredients:
Activated carbon
Sulfuric acid
Fumed silica
butanol 35 grams of high-surface area activated carbon (Black Pearl Carbon 2000 Manufactured by Cabot Corporation) were mixed with 2 grams of fumed silica (CAB-O-SIL™ grade M-5 of Cabot Corporation). To the powder obtained was added a mixture of 520 grams of an aqueous solution of $H_2SO_4$ (2.5M) and 16 grams of butanol. Following an extensive mixing for 24 hours using ball mills, a paste-like composition is formed, suitable for screen-printing applications.

Example 4

Preparing a Printable Composition for the Electrodes

Ingredients:
Activated carbon
Sulfuric acid
Fumed silica
Propylene glycol
Sodium chloride 35 grams of high-surface area activated carbon (Black Pearl Carbon 2000 Manufactured by Cabot Corporation) were mixed with 2 grams of fumed silica (CAB-O-SIL™ grade M-5 of Cabot Corporation). To the powder obtained was added a mixture of 520 grams of aqueous solution of $H_2SO_4$ (2M), 13 grams of propylene glycol and 3 grams of sodium chloride. Following an extensive mixing for 24 hours using ball mills, a paste-like composition is formed, suitable for screen-printing applications.

Example 5

Depositing Electrodes on Current Collectors

A current collector plate was placed on the vacuum table of a screen-printing device provided with a polyester screen of 165 mesh, said screen having the form illustrated in FIG. 1. The printable composition of example 4 was screen printed onto the one face of the current collector, to form sixteen separated electrodes thereon. The procedure was repeated in respect to a second current collector.

Example 6

Masking the Pores of a Separator and Depositing Adhesives Thereon

A separator was placed on the vacuum table of a screen-printing device provided with a polyester screen of mesh corresponding to 18 cc per $m^2$ (325 mesh), which screen has the form illustrated in FIG. 2. UV curable epoxy (Vitralit 1712) was screen-printed onto the separator, which was immediately subjected to UV radiation, in order to rapidly cure the epoxy. The separator was placed again on the vacuum table of the screen-printing device, and a suitable adhesive (Diglyceretherbisphenol $CH_2OCHCH_2O$—$C_6H_4C$$(CH_3)_2$—$C_6H_4OCH_2CHOCH_2$ (Epon-828 manufactured by shell or GY-250 manufactured by henkel), in combination with Polypropyletheramine (Aradur 76 manufactured by Henkel)) was screen-printed thereon using the mesh described above.

Example 7

Blocking the Pores of the Separator Using Heat and/or Pressure Activated Adhesive A porous polyethylene membrane manufactured by Electroflex was used as the separator. The membrane was placed on a silicone release paper (silicone polycoated film 4998 manufactured by 3M), and a rubber roller was used to join the membrane and the paper, whereby a thin film composed of said membrane and paper same is obtained.

The film is placed on the vacuum table of a screen-printing device, wherein the membrane faces the screen of said device. The device (manufactured by Deck) is provided with a 110 polyester mesh screen, which has been previously masked using a suitable photo emulsion screen, such as Kiwocol 227, thereby converting said polyester mesh screen into the desired form of the template illustrated in FIG. 2.

100 grams of a suitable sealant (AG50, manufactured by Coats Company) are screen-printed onto the membrane, with a polyurethane squeegee 50–70 shore being used at a speed of about 4–8 cm/sec. Upon completing the printing procedure, the film is passed through a drying heated tunnel (Amipresco) at 60° C. The membrane is than detached from the release paper, and its masked regions may be readily observed. The surface of the membrane may be rendered adhesive by heating and/or pressing the same before it is attached to the current collectors.

Example 8

Preparation of a Laminated Structure

The adhesive face of the separator obtained by Example 6 was affixed to the printed face of one of the current collectors according Example 5, and the procedure of Example 6 was repeated in respect to the open face of said separator, following which the second current collector was affixed thereto.

While specific embodiments of the invention have been described for the purpose of illustration, it will be understood that the invention may be carried out in practice by skilled persons with many modifications, variations and adaptations, without departing from its spirit or exceeding the scope of the claims.

The invention claimed is:

1. An electrochemical cell comprising:
   at least a pair of current collector plates that are placed in parallel to each other,
   flat electrodes containing aqueous electrolyte printed on opposing faces of said current collectors, such that a peripheral region is defined on each of said faces of said current collectors, which region is not covered by said electrode, and
   a separating medium interposed between said electrodes, the geometric form and size of said separating medium being identical to the form and size of said current collector plates, said separating medium having a central region permeable to said electrolyte, surrounded by a peripheral masked region which is non-permeable to said electrolyte, such that the permeable region of said separating medium coincide with the electrodes printed on the opposing faces of said current collectors, with respect to position, geometric form and size;
   wherein the pores in the peripheral region of the separating medium are impregnated with a suitable sealant, and wherein one or more layers of adhesives are deposited on said sealant in said peripheral region.

2. An electrochemical cell according to claim 1, wherein the sealant blocking the pores of the separating medium is made of a printable, rapidly curable material.

3. An electrochemical cell according to claim 1, wherein the sealant blocking the pores of the separating medium is selected from the group consisting of hot melt adhesives, solvent based adhesives, polyurethanes, silicones, cyanoacrylates, PVC adhesives, Acrylic adhesives, UV based adhesives, water based glues, polysulfides rubber or synthetic rubbers, phenolic resins pressure sensitive adhesives, UV cured pressure sensitive adhesives and solvent based pressure sensitive adhesives.

4. An electrochemical cell according to claim 1, wherein the sealant blocking the pores of the separating medium is UV based adhesive which is UV curable epoxy.

5. An electrochemical cell according to claim 1, wherein the pores in the peripheral region of the separating medium are impregnated with a sealant which is selected from the group consisting of heat and/or pressure activated adhesives, and wherein the one or more layers of adhesives deposited on said sealant in said peripheral region is one or more continuous layers made of the same heat and/or pressure activated adhesives used to block said pores.

6. An electrochemical cell according to claim 5, wherein the heat and/or pressure activated adhesive blocking the pores has been placed in said pores by means of a liquid vehicle, which has been subsequently evaporated.

7. An electrochemical cell according to claim 1, wherein the pores in the peripheral region of the separating medium are impregnated with a sealant comprising a polymeric material that has been introduced into said pores in a molten state and was allowed to solidify therein.

8. An electrochemical cell according to claim 1, wherein the peripheral masked region which is non-permeable to the electrolyte comprises non-porous zones obtained by causing the pores of the separating medium to collapse within said zones.

9. An electrochemical capacitor according to claim 1.

10. A bi-polar electrochemical capacitor comprising a basic cell in the form of the cell of claim 1.

11. An electrochemical cell comprising:
at least a pair of current collector plates that are placed in parallel to each other,
flat electrodes containing aqueous electrolyte printed on opposing faces of said current collectors, such that a peripheral region is defined on each of said faces of said current collectors, which region is not covered by said electrode, and
a separating medium interposed between said electrodes, the geometric form and size of said separating medium being identical to the form and size of said current collector plates, said separating medium having a central region permeable to said electrolyte, surrounded by a peripheral masked region which is non-permeable to said electrolyte, such that the permeable region of said separating medium coincide with the electrodes printed on the opposing faces of said current collectors, with respect to position, geometric form and size;

and wherein the electrode comprises carbon particles, aqueous electrolyte, inorganic filler selected from the group consisting of fumed silica, high surface area alumina, bentonites, glass spheres and ceramics and one or more hydroxy-containing compound(s), which are preferably alcohols or polyols, wherein the hydroxy group(s) is (are) attached to $C_1$–$C_7$ alkyl, $C_2$–$C_7$ alkenyl, $C_3$–$C_7$ alkynyl or $C_3$–$C_7$ carbocyclic radicals, and optionally an alkali halide salt.

12. An electrochemical cell according to claim 11, wherein the inorganic filler is fumed silica, the hydroxy-containing compound is propylene glycol and the salt is NaCl.

* * * * *